TRANSDUCER FOR USE WITH VARIABLE FREQUENCY MAGNETRONS

Filed Sept. 1, 1964

INVENTOR.
SALVATORE BARBASSO, JR.
BY
Frank R. [signature]
AGENT

United States Patent Office
3,365,609
Patented Jan. 23, 1968

3,365,609
TRANSDUCER FOR USE WITH VARIABLE FREQUENCY MAGNETRONS
Salvatore Barbasso, Jr., Bayshore, N.Y., assignor to North American Philips Company, Inc., New York, N.Y., a corporation of Delaware
Filed Sept. 1, 1964, Ser. No. 393,507
8 Claims. (Cl. 315—39.55)

ABSTRACT OF THE DISCLOSURE

A variable frequency magnetron transducer employing a cylindrical tuning element rotatable about a plurality of anode cavities. The tuning element is provided about its circumference with a plurality of apertures for varying the resonant frequency of each anode cavity. The position of the apertures within the tuning element is detected by a Hall effect semiconductor mounted element in the transducer wall opposite a second series of apertures above the tuning apertures. The tuning apertures and position apertures rotate synchronously.

This invention relates to magnetrons and more particularly to variable frequency magnetrons with means for supplying frequency information.

Many radar applications require frequency agility, that is the ability to vary the transmitted frequency over a preselected range in order to avoid jamming, mutual interference with other friendly radar sources or to effectuate counter measures.

A number of magnetrons capable of providing frequency agility are currently available, see for example U.S. Patent 2,931,943 to Backmark and the article, "New Magnetron Shifts Frequency Fast," Electronics, Apr. 6, 1964, pages 76–81 which compares the older reciprocating type of magnetron frequency control with the newer and more efficient rotary type as disclosed by Backmark in the above cited patent.

Where frequency agility is employed it is necessary that an indication of the frequency of the magnetron be provided so that the receiver local oscillator may be preset to correspond to the transmitted frequency.

With the older reciprocating type of magnetron frequency control, the generation of a signal indicative of the instantaneous transmitter frequency presented virtually no problem since a direct positive connection between the tuning fingers employed within the magnetron for controlling the frequency and the actuating device was available. Thus, the position of the tuning fingers and therefore the frequency was known.

However, in the rotary type of magnetron frequency control a magnetic drive through the vacuum envelope is employed and the slip present in this type drive prevents the use of an external signal generator because the signal generator must be positively locked or synchronized to the tuning teeth or fingers since the position of these fingers with respect to the cavities determines the frequency.

The solution of this problem, illustrated in the above cited article employs a capacitor transducer. This solution is in many respects unsatisfactory since it must be physically large, and in high frequency tubes this disadvantage is greatly emphasized.

One object of the invention is to provide a transducer for supplying information concerning the frequency of a magnetron which is capable of both agile and fixed mode frequency operation.

Another object of the invention is to provide a transducer for use with tunable magnetrons which is small in size, reliable in operation and has a long life.

A further object of the invention is to provide a transducer as set forth above in which the positional information relative to the tuner and the magnetron frequency is transmitted through the vacuum vessel without the use of mechanical means.

The invention contemplates a transducer for use with a tunable magnetron. A magnetron tube, having a movable tuning element enclosed within the vacuum vessel, is provided with a Hall effect device. A magnetic field is established normal to the Hall effect device and traversing at least a portion of the interior of the vacuum vessel. A mechanism is positioned in the vessel and movable synchronously with the tuning element for interacting with the established field to cause a variation of the magnetic field normal to the Hall effect device as a function of the instantaneous position of the positioned mechanism whereby the Hall effect device provides electric signals corresponding to the frequency of the magnetron.

The foregoing and other objects and advantages of the invention will become more apparent from a consideration of the drawing and specification wherein one embodiment of the invention is shown and described for illustration purposes only.

Figure 1:
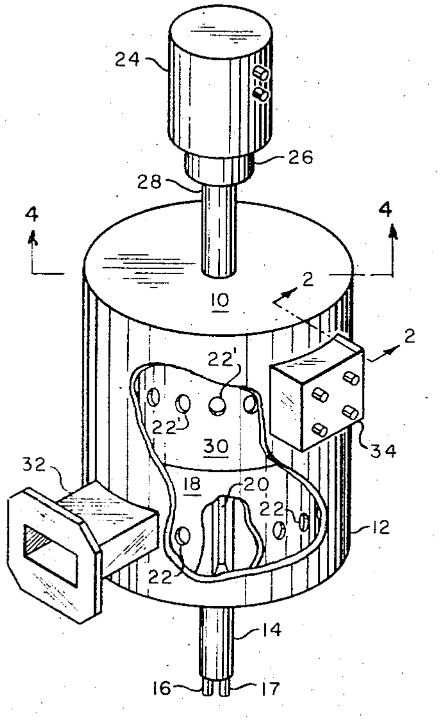
FIG. 1 is an isometric view of a magnetron tube employing a novel transducer constructed according to the invention.
Figure 4:
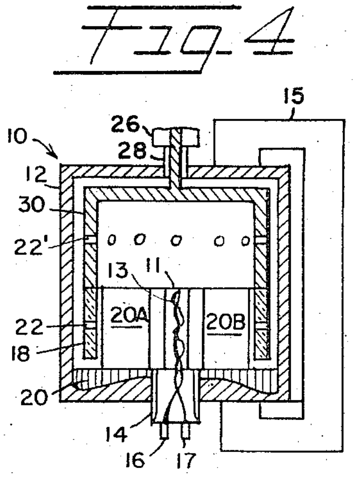
FIGURE 4 is a cross sectional view taken along line 4—4 of FIGURE 1.

In FIGURES 1 and 4 a magnetron including a transducer according to the invention is generally indicated at 10. The outer envelope includes a wall 12 which is cylindrical and forms a part of the vacuum vessel within which a cathode 11, a heater 13 and an anode 20 must be operated. Both the heater and cathode leads pass through an insulator support 14 from terminals 16 and 17, respectively.

The outside wall 12 is preferably constructed of magnetic material and acts as the pole piece for the magnet 15. Wall 12 is cutaway to show the internal structure which includes a cylindrical tuner 18 which encircles the anode 20, only one cavity of which is shown through the broken portion in the body of tuner 18. Cavity forming plates 20A and 20B are shown in the sectional view of FIG. 4. The structure thus far described may be constructed exactly as shown in the Backmark patent supra, however, the fingers have been slightly modified and their equivalent is formed by the portions of tuner 18 between holes 22. The tuner in the vicinity of anode 20 is made of non-magnetic material.

The tuner is rotatably driven by a motor 24 through a magnetic drive 26 which turns a drive shaft 27 supported in a cylindrical portion 28 of tube 10. The shaft is directly coupled to the upper portion 30 of tuner 18. The tube output is coupled in a conventional manner to a waveguide 32.

The upper portion 30 of tuner 18 is constructed of magnetic material and includes a plurality of holes 22' in registration or radial alignment with holes 22 in the lower portion of tuner 18. A Hall effect device, shown in FIGURE 2, is mounted on the wall 12 and is electrically connected to a terminal box 34 also supported by wall 12.

The operation of the magnetrons insofar as the generation of microwave frequencies in either agile or fixed frequency mode is substantially as described in the Backmark patent. Thus as the tuner is rotated the frequency of the magnetron will vary depending on the angular position of the holes or the material therebetween with respect to the cavities. A full frequency excursion occurring each time a hole moves from one cavity to the next.

Figure 2:
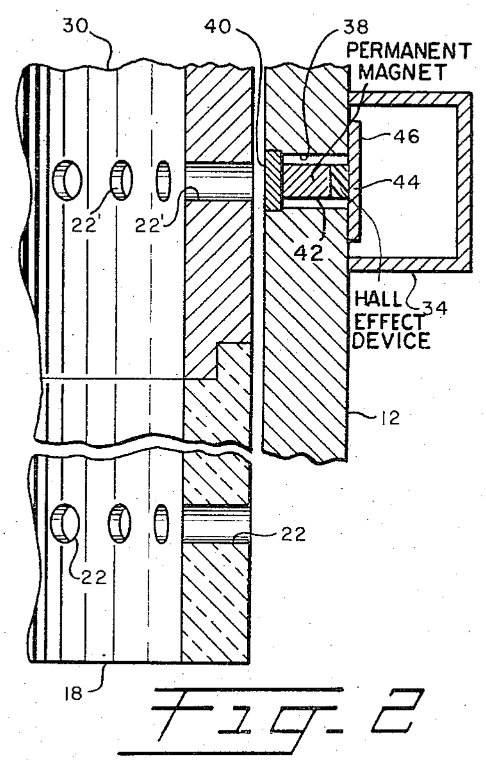
FIGURE 2 is an enlarged sectional view taken on the line 2—2 of FIGURE 1 of a portion of the structure.

It is desirable to know the position in order to secure frequency information about the magnetron and the details of the transducer for detecting the hole position with respect to the cavities is shown in FIGURE 2 in which elements previously described are indicated by the same reference numerals.

The Hall effect device is mounted in an opening 38 in wall 12. A magnetic window is formed in the wall by a nonmagnetic member 40 positioned in the opening 38 in vacuum sealing engagement with wall 12. A permanent magnet 42 with a Hall effect semiconductor element 44 on one end is clamped between member 40 and an iron shield 46. Thus the field generated by the magnet 42 passes perpendicularly through the Hall element 44, iron shield 46, wall 12, the upper portion 30 of tuner 18 and back to magnet 42. From this it is seen that the reluctance of the path will vary as a hole 22' passes window 40.

Figure 3:
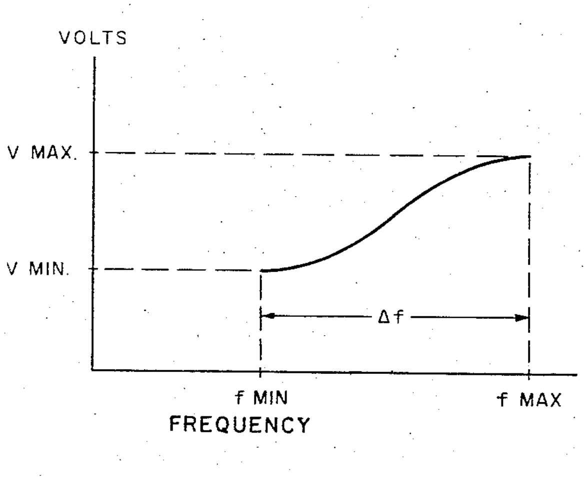
FIGURE 3 is a graph illustrating the calibration of the output signal of the transducer as a function of magnetron frequency.

As the field varies, due to the change in reluctance of the path, with the angular position of holes 22' the output voltage of the Hall element will vary since it is a function of the perpendicular field. The output voltage may be calibrated as shown in FIGURE 3 as a function of magnetron frequency and once calibrated will remain constant.

The Hall element provides a transverse potential $V_h$ which is proportional to the product of the perpendicular field strength and a longitudinal current applied to two of the four terminals shown in FIGURE 1. The output signal $V_h$ is taken at the other two terminals. The details of the Hall element have not been shown since they were well known in the art, see "Electronics," Nov. 8, 1963, page 46.

The Hall element is preferably located outside the tube vacuum system, however, its location is not critical and it could be relocated to within the vessel. In addition, it need not be positioned closely to the tuner so long as holes 22' are moved in synchronism with holes 22 in tuner 18. It will also be obvious that the invention may be used with reciprocating as well as rotary tuned magnetrons.

While a single embodiment of the invention has been shown and described in detail for illustration purposes, it is to be expressly understood that the invention is not limited thereto. Various changes may also be made in the design and arrangement of the parts without departing from the spirit and scope of the invention as the same will now be understood by those skilled in the art.

I claim:

1. A tunable magnetron with a transducer for supplying frequency information comprising, a magnetron tube having a movable tuning element enclosed within the vacuum vessel, first means responsive to a magnetic field for providing signals indicative of at least one manifestation of said field, second means for establishing a magnetic field in the vicinity of said first means for interacting therewith and traversing at least a portion of the interior of the vacuum vessel, and third means positioned within the vessel and movable synchronously with the tuning element for varying the magnetic field in the vicinity of the first means as a function of the instantaneous position of the third means whereby the signals supplied by said first means correspond to the instantaneous tuner position which determines the magnetron frequency.

2. A tunable magnetron with a transducer for supplying signals corresponding to the frequency of the magnetron comprising, a magnetron tube having a movable tuning element enclosed within the vacuum vessel, a Hall effect device, first means for establishing a magnetic field normal to the Hall effect device and traversing at least a portion of the interior of the vacuum vessel, and second means positioned in the vessel and movable synchronously with the tuning element for interacting with the field established by the first means to cause a variation of the magnetic field normal to the Hall effect device as a function of the instantaneous position of the second means whereby the Hall effect device provides electric signals corresponding to the frequency of the magnetron.

3. A tunable magnetron with a transducer for supplying signals corresponding to the magnetron frequency comprising, a magnetron tube including a heater, a cathode and a multi-cavity anode enclosed within a vacuum vessel, a cylindrical member arranged for rotation within the vacuum vessel and carrying at one end thereof a plurality of circumferentially spaced tuning elements, one for each said anode cavity and cooperating with said cavities for changing the cavity resonant frequency as a function of the angular position of the cylindrical member, a plurality of apertures through said cylindrical member axially spaced from said tuning elements and circumferentially disposed about the member, said apertures being equal in number to the tuning elements and each in radial registration with a different one of said tuning elements, first means responsive to a magnetic field for providing signals indicative of at least one manifestation of said field, and second means for establishing a common magnetic field in the vicinity of said first means and a point traversed by the apertures on the cylindrical member during rotation whereby the reluctance of the path of the magnetic field varies as a function of the angular position of the cylindrical member to thereby vary the field strength in the vicinity of the first means.

4. A magnetron as set forth in claim 3 in which the first means is a Hall effect device.

5. A magnetron as set forth in claim 4 in which said second means is a permanent magnet which establishes a field normal to the Hall effect device.

6. A tunable magnetron with a transducer for supplying signals corresponding to the frequency of the magnetron comprising, a magnetron tube having a movable tuning element enclosed within the vacuum vessel, first means for supplying a signal indicative of one manifestation of a magnetic field located outside said vessel and in proximity thereto, second means located outside said vessel for establishing a magnetic field including a portion of the interior of the vessel and the first means within the field, and third means positioned within the vessel at least partially within the magnetic field at all times and synchronously movable with the tuning element for varying the magnetic field as a function of the instantaneous position of the said third means whereby the signals supplied by said first means correspond to the instantaneous tuner position which is determinative of the magnetron frequency.

7. A magnetron as set forth in claim 6 in which the first means is a Hall effect device.

8. A magnetron as set forth in claim 7 in which said second means includes a permanent magnet and the established field is normal to the Hall effect device.

References Cited

UNITED STATES PATENTS

| | | | |
|---|---|---|---|
| 2,931,943 | 4/1960 | Backmark | 315—39.61 |
| 3,087,124 | 4/1963 | McLeod | 331—5 X |
| 3,247,421 | 4/1966 | Backmark | 315—39.61 |
| 3,281,682 | 10/1966 | Bauerlein | 324—70 |
| 3,317,829 | 5/1967 | Kuhrt et al. | 324—45 X |

HERMAN KARL SAALBACH, *Primary Examiner.*

ELI LIEBERMAN, *Examiner.*

S. CHATMON, Jr., *Assistant Examiner.*